United States Patent
Li et al.

(10) Patent No.: US 7,035,497 B2
(45) Date of Patent: Apr. 25, 2006

(54) MINIATURE 1×2 MAGNETO-OPTIC SWITCH

(75) Inventors: Shifang Li, Pleasanton, CA (US); Qing Shao, Santa Clara, CA (US)

(73) Assignee: Oplink Communications, Inc., Fremont, CA (US)

( * ) Notice: Subject to any disclaimer, the term of this patent is extended or adjusted under 35 U.S.C. 154(b) by 139 days.

(21) Appl. No.: 10/280,307

(22) Filed: Oct. 25, 2002

(65) Prior Publication Data
US 2004/0081392 A1 Apr. 29, 2004

(51) Int. Cl.
*G02B 6/26* (2006.01)
(52) U.S. Cl. .............................. 385/16; 385/18; 385/36; 359/484
(58) Field of Classification Search ................... 385/16, 385/2, 5, 6, 18, 33, 36; 359/484, 256
See application file for complete search history.

(56) References Cited

U.S. PATENT DOCUMENTS

| | | | |
|---|---|---|---|
| 5,973,821 A * | 10/1999 | Onaka et al. ............... 359/283 |
| 6,263,131 B1 | 7/2001 | Frisken et al. | |
| 6,333,806 B1 * | 12/2001 | Onaka et al. ............... 359/283 |
| 6,333,816 B1 * | 12/2001 | Chen et al. ................. 359/497 |
| 6,404,538 B1 * | 6/2002 | Chen et al. ................. 359/323 |
| 6,441,960 B1 * | 8/2002 | Wang et al. ................ 359/497 |
| 6,480,331 B1 * | 11/2002 | Cao ............................ 359/484 |
| 6,493,139 B1 * | 12/2002 | Liu et al. .................... 359/484 |
| 6,631,238 B1 * | 10/2003 | Liu et al. .................... 385/140 |
| 2001/0053022 A1 * | 12/2001 | Tai et al. .................... 359/484 |
| 2003/0058536 A1 * | 3/2003 | Huang et al. ............... 359/495 |

* cited by examiner

*Primary Examiner*—Kianni C. Kaveh
(74) *Attorney, Agent, or Firm*—Fish & Richardson P.C.

(57) ABSTRACT

A magneto-optical switch includes a birefringent crystal that receives a light beam, a half-wave plate pair that receives the light beam from the birefringent crystal, a Faraday rotator that receive the light beam from the half-wave plate, a prism that receives the light beam from the Faraday rotator, and a reflective surface that receives the light beam from the Faraday rotator. The Faraday rotator receives an electromagnetic field to change the polarization of the light beam as it passes through the Faraday rotator.

16 Claims, 4 Drawing Sheets

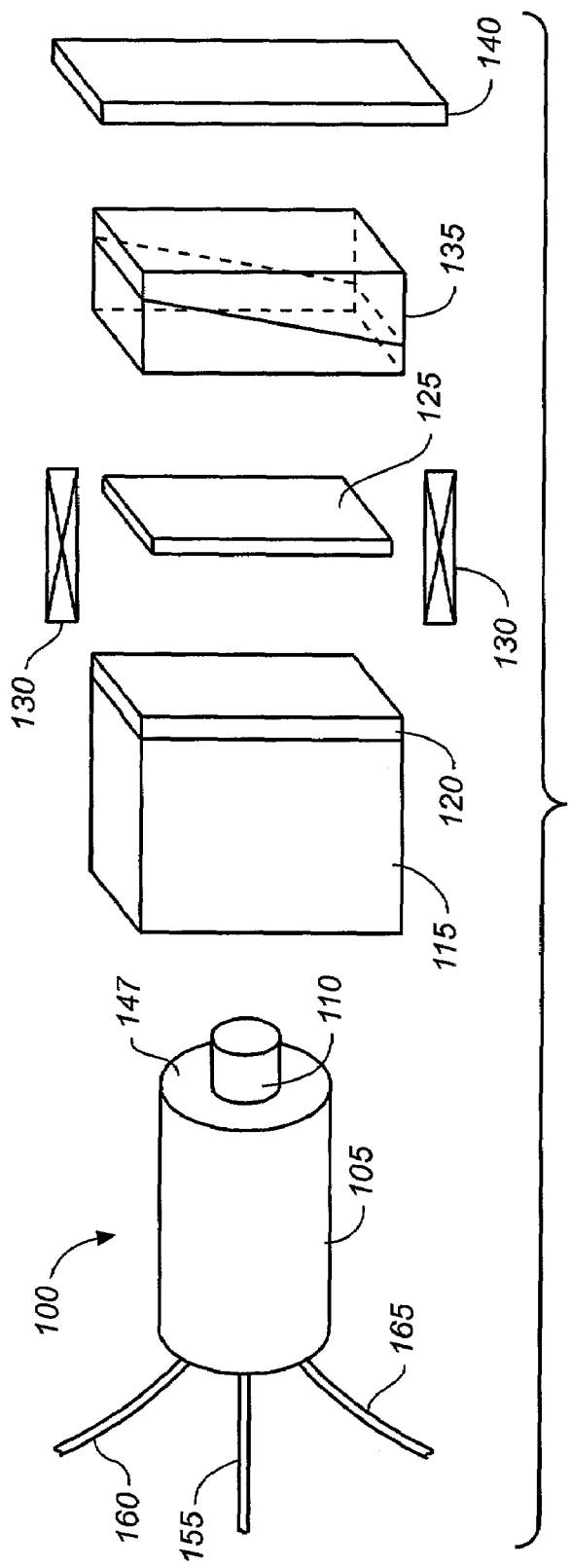
FIG._1a
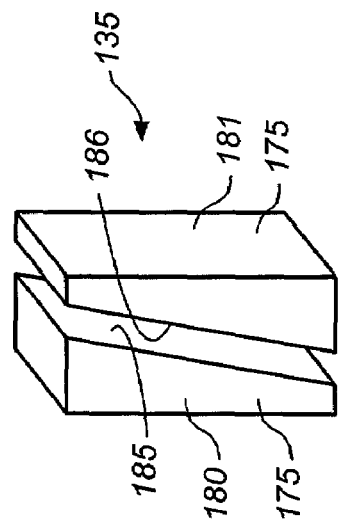
FIG._2
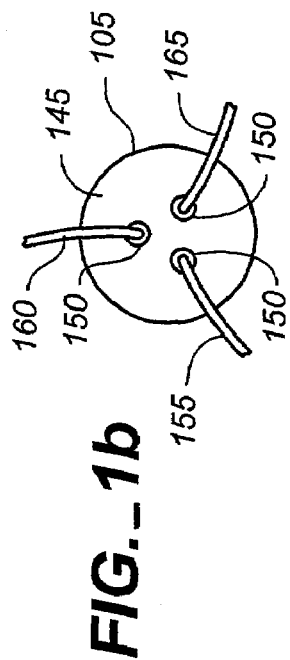
FIG._1b

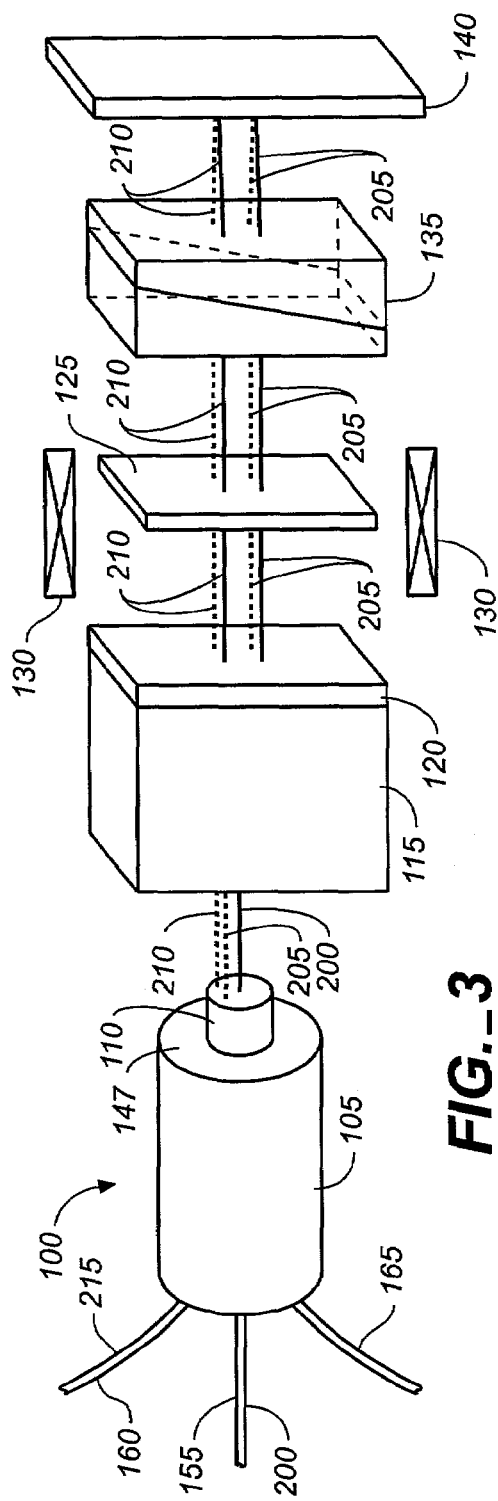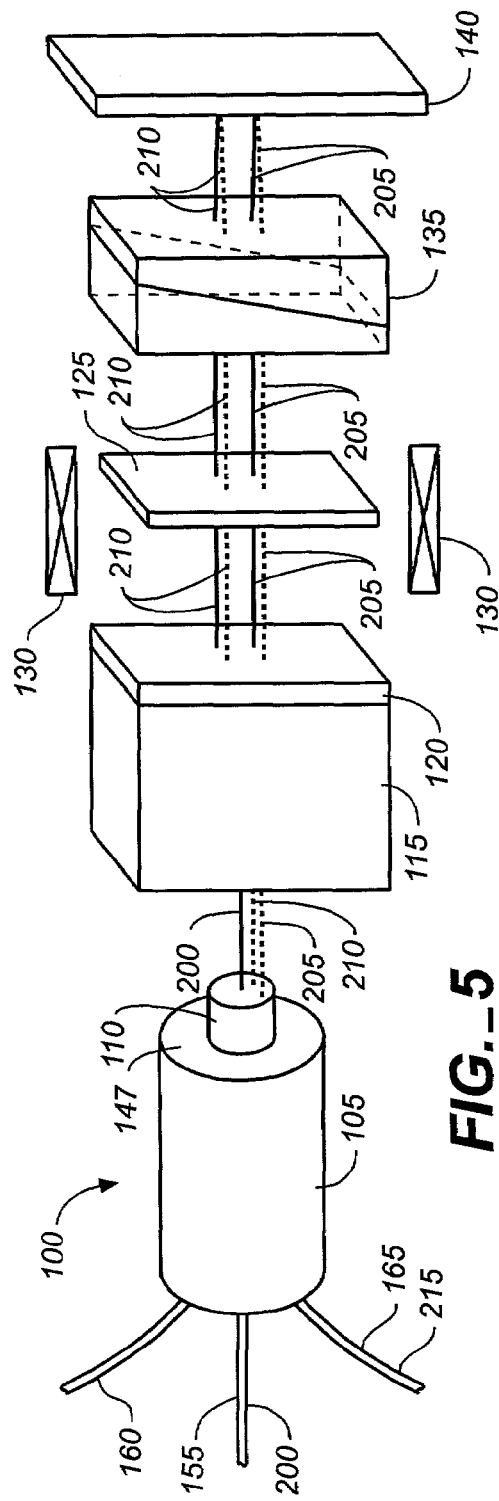

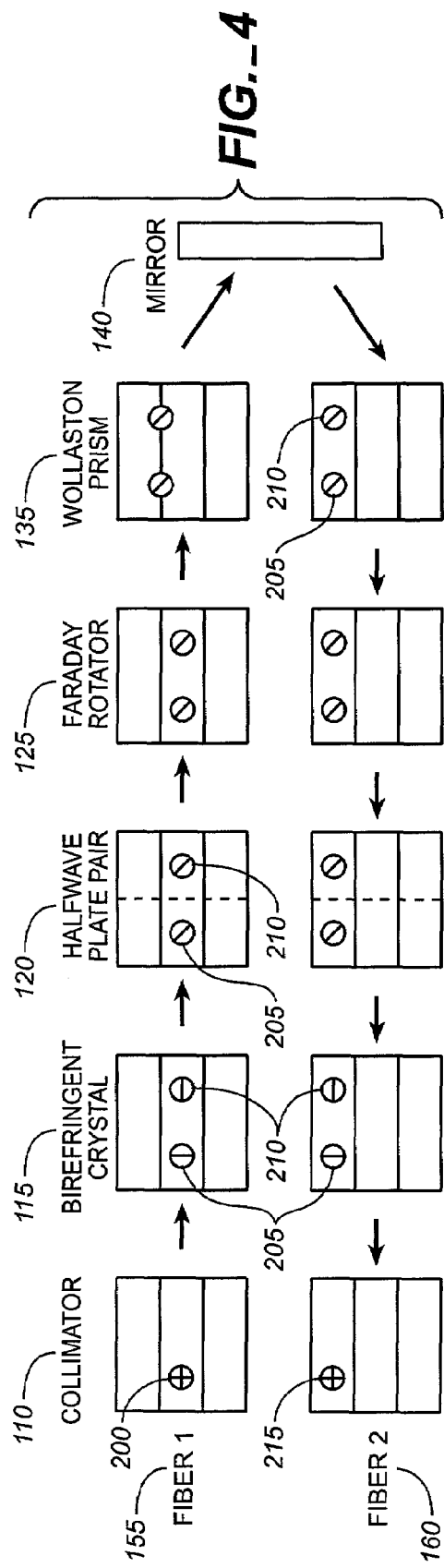
FIG._4
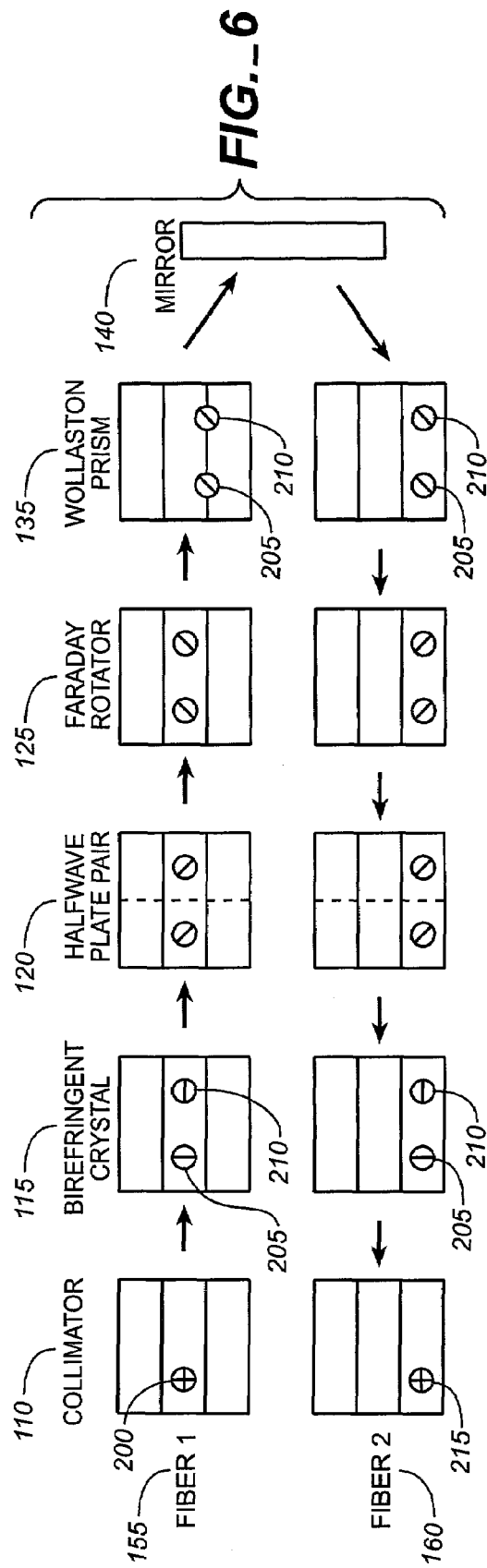
FIG._6

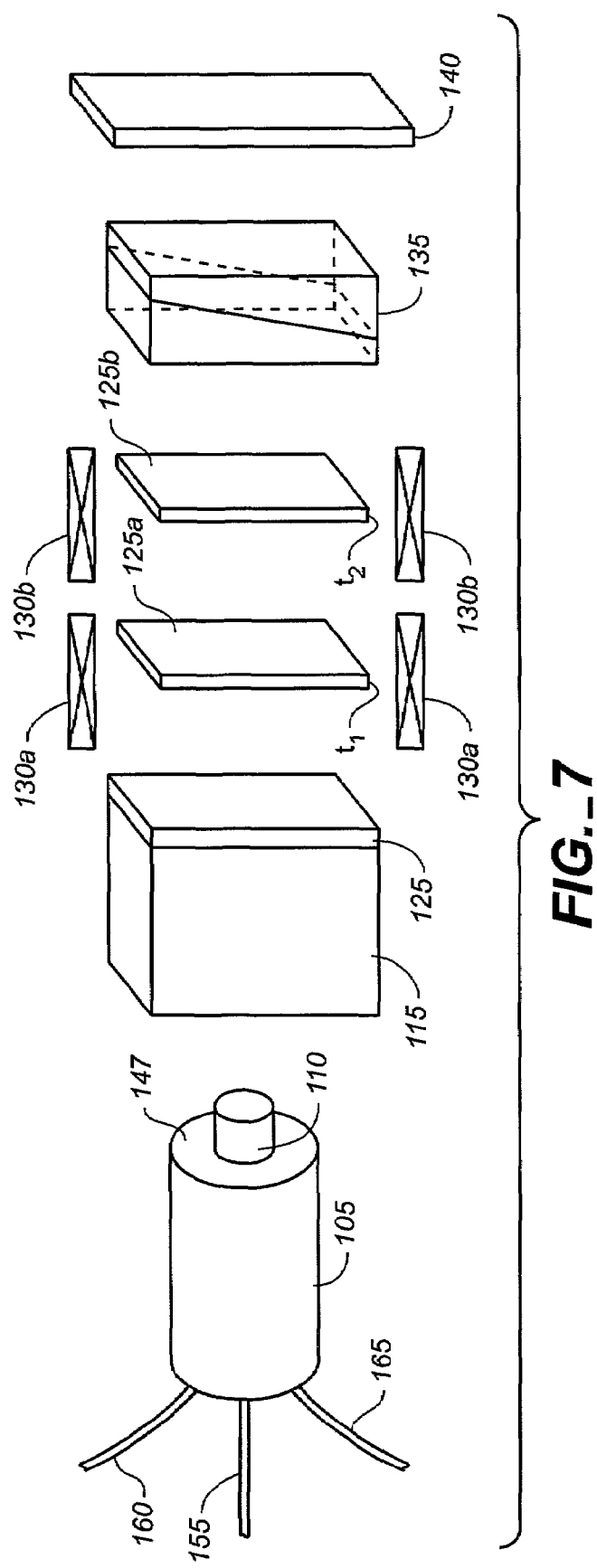

MINIATURE 1×2 MAGNETO-OPTIC SWITCH

TECHNICAL FIELD

This invention relates generally to optical technology, and more particularly to magneto-optical switches.

BACKGROUND

Optical switches are used in optical systems to switch a light beam between an input fiber and one or more output fibers. For example, optical switches are used in optical communication systems to connect and disconnect transmission paths to route light beams modulated with information, provide network protection, provide cross connection, and for add/drop applications. Optical switches also can be used to pulse a light source, e.g., a laser, or perform other functions with modulated or unmodulated light beams.

One type of optical switch is a 1×2 optical switch, which provides optical switching between one input holder or port and two output holders or ports. It is known that 1×2 optical switches using refractive optics are very reliable, have small insertion loss, and are easy to manufacture. The 1×2 optical switch has been used widely in the telecommunications industry, such as for protection switching, tag switching, etc. The 1×2 optical switch also has been used to build larger dimension switches, such as 1×4 and 1×8 optical switches. In some cases, the application needs to integrate multiple 1×2 optical switches together to reduce power consumption and/or physical space used.

There are many technologies used to implement these switches, such as mechanical, electro-optic, thermo-optic, acousto-optic, magneto-optic and semiconductor technologies. Each switching technology has advantages and disadvantages. For example, mechanical switches are the most widely used routing components and provide very low insertion loss and cross-talk characteristics. However, the switching times of mechanical switches are limited to the millisecond range and the devices themselves are bulky. Moreover, if motor-driven parts are used to operate the switch, the switch will have a limited operative lifetime and may suffer from reliability issues.

SUMMARY

In one general aspect, a magneto-optical switch includes a birefringent crystal that is configured to receive a light beam, a half-wave plate pair configured to receive the light beam from the birefringent crystal, a Faraday rotator configured to receive the light beam from the half-wave plate, a prism configured to receive the light beam from the Faraday rotator, and a reflective surface configured to receive the light beam from the Faraday rotator. The Faraday rotator is configured to receive an electromagnetic field to change the polarization of the light beam as it passes through the Faraday rotator.

Embodiments of the switch may include one or more of the following features. For example, the switch may further include a port. The port may be configured to receive optical fibers. Three optical fibers may be mounted in the port. The switch may further include a lensing element, the birefringent crystal receiving the light beam from the lensing element and the lensing element receiving the light beam from the port.

The birefringent crystal may separate a received light beam into two polarized beams. The half-wave plate pair may cause the light beams passing through the half-wave plate pair to have the same polarization state. The Faraday rotator may change the polarization state of the light beams by a first amount when an electromagnetic field is applied and by a second amount when the electromagnetic field is removed. The Faraday rotator may rotate the light beams by 90 degrees when the electromagnetic field is applied. The switch may further include a port coupled to a first input optical fiber, a first output optical fiber, and a second output optical fiber, and the light beam may pass between the first input optical fiber and the first output optical fiber when the electromagnetic field is applied and between the first input optical fiber and the second output optical fiber when the electromagnetic field is removed. The switch may instead be configured such that the light beam passes between the first input optical fiber and the second output optical fiber when the electromagnetic field is applied and between the first input optical fiber and the first output optical fiber when the electromagnet is removed.

The prism may be a Wollaston prism. The Wollaston prism may refract light beams passing therethrough. The reflective surface may be a mirror. The reflective surface may be positioned adjacent to the Wollaston prism such that a light beam passing through the Wollaston prism is reflected by the reflective surface in a direction of the Wollaston prism.

In another general aspect, switching a light beam between a first optical output port and a second optical output port includes providing a light beam, passing the light beam through a birefringent crystal, passing split light beams from the birefringent crystal through a half-wave plate pair, passing the split light beams from the half-wave plate pair through a Faraday rotator, and passing the split light beams from the Faraday rotator through a prism. The Faraday rotator is configured to receive an electromagnetic field to change the polarization of the split light beams as they pass through the Faraday rotator.

Embodiments of the method of switching the light beam may include one or more of the following features. For example, switching the light beam may further include reflecting the split light beams from the prism by a reflective surface, the reflective surface being positioned relative to the prism such that the split light beams reflected by the reflective surface reenter and pass through the prism. Applying the electromagnetic field may cause the split light beams to be reflected by a first portion of the reflective surface and removing the electromagnetic field may cause the split light beams to be reflected by a second portion of the reflective surface. Switching may further include passing the split light beams reflected by the reflective surface through the prism. Switching may further include passing the split light beams from the prism through the Faraday rotator, the half-wave plate pair, and the birefringent crystal.

Switching may still further include passing the split light beams through a lensing element to combine the light beams into a single combined light beam, the single combined light beam passing through the first optical output port when the magnetic field is removed and the second optical output port when the magnetic field is applied.

Switching may further include passing the light beam from the input fiber through a port and a lensing element, the light beam passing from the lensing element to the birefringent crystal. Passing the light beam through the birefringent crystal may separate the beam of light into two polarized light beams. Passing the two polarized light beams through the half-wave plate pair causes the light beams to have the same polarization state.

Passing the split light beams through the Faraday rotator rotates a polarization of the split light beams by a first amount when the electromagnetic field is applied and by a second amount when the electromagnetic field is removed. The first amount may be 90 degrees relative to the polarization of the split light beams within the half-wave plate pair.

The switch may further include port having a first input optical port and applying the electromagnet field may cause the light beam to pass between the first input optical port and the first output optical port and removing the electromagnetic field may cause the light beam to pass between the first input optical port and the second output optical port. The switch also may be arranged such that applying the electromagnetic field causes the light beam to pass between the first input optical port and the second output optical port and removing the electromagnetic field causes the light beam to pass between the first input optical port and the first output optical port.

The prism may be a Wollaston prism. The prism may refract light beams passing therethrough. The reflective surface may be a mirror. The reflective surface may be positioned adjacent to the prism such that a light beam passing through the prism is reflected by the reflective surface in a direction of the prism.

In another general aspect, a switch includes a component group and an electromagnetic field inducing agent. The component group includes a birefringent crystal, a half-wave plate, a Faraday rotator, a prism, and a reflector. The birefringent crystal is coupled to the half wave plate, the half-wave plate is further coupled to the Faraday rotator, the Faraday rotator is further coupled to the prism, and the prism is further coupled to the reflector. The electromagnetic field inducing agent adjusts a magnetic field in a vicinity of the Faraday rotator so as to adjust an amount of rotation of polarization contributed to the Faraday rotator such that a light beam exiting from the prism is reflected along two distinct paths back through the component group.

Embodiments of the switch may include one or more of the following features. For example, the switch may further include a port configured to receive optical fibers. Three optical fibers may be coupled to the port. The switch may further include a lensing element coupled to the port and the birefringent crystal.

The Faraday rotator may be configured to change the polarization state of the light beams by a first amount when the electromagnetic field is applied and by a second amount when the electromagnetic field is removed. The Faraday rotator may be configured to rotate the light beams by 90 degrees when the electromagnetic field is applied.

The switch may further include a port coupled to a first input optical fiber, a first output optical fiber, and a second output optical fiber so that a light beam passes between the first input optical fiber and the first output optical fiber when the electromagnetic field is applied and between the first input optical fiber and the second output optical fiber when the electromagnetic field is removed.

The switch may further include a port coupled to a first input optical fiber, a first output optical fiber, and a second output optical fiber so that a light beam passes between the first input optical fiber and the second output optical fiber when the electromagnetic field is applied and between the first input optical fiber and the first output optical fiber when the electromagnetic field is removed.

The reflective surface may be a mirror. The prism may be configured to refract light beams passing therethrough. The prism may be a Wollaston prism. The reflective surface may be positioned adjacent to the Wollaston prism such that a light beam passing through the Wollaston prism is reflected by the reflective surface in a direction of the Wollaston prism. The electromagnetic field inducing agent may include an electromagnet.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1a is a perspective side view of the optical components of a magneto-optic switch.

FIG. 1b is an end view of a holder of the switch of FIG. 1a.

FIG. 2 is a perspective view of the wedges of a Wollaston prism used in the switch of FIG 1a.

FIG. 3 is a perspective side view of the optical components of the switch of FIG. 1a used to direct a light beam between a first pair of fibers.

FIG. 4 depicts the rotation of the light beam as it passes through the optical switch of FIG. 3.

FIG. 5 is a perspective side view of the optical components of the switch of FIG. 1a used to direct a light beam between a second pair of fibers.

FIG. 6 depicts the rotation of the light beam as it passes through the optical switch of FIG. 5.

FIG. 7 is a perspective side view of the optical components of a switch having a pair of Faraday rotators.

Like reference symbols in the various drawings indicate like elements.

DETAILED DESCRIPTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principles herein may be applied to other embodiments. Thus, the present invention is not intended to be limited to the embodiments shown, but is to be accorded the widest scope consistent with the principles and features described herein.

The present invention will be described in terms of particular optical switches having specific components having a specific configuration. Similarly, the present invention will be described in terms of particular optical switch components having specific relationships, such as distances or angles between components. However, one of ordinary skill in the art will readily recognize that this method and system will operate effectively for other components having similar properties, other configurations; and other relationships between components.

FIGS. 1a and 1b show an arrangement of the optical components in a magneto-optic fiber-optic switch 100 (hereinafter, switch 100). Switch 100 provides an optical switch that does not have moving parts, provides good optical performance, has a high switch speed, and can be implemented in a small size. Switch 100 includes a port 105, such as a holder, pigtail or glass capillary, a lensing element 110, a birefringent crystal 115, a half-wave plate pair 120, a Faraday rotator 125, an electromagnet 130, a prism 135 (e.g., a Wollaston prism), and a reflective surface, such as a mirror 140. The port 105 includes a first face 145 and a second face 147. First face 145 includes one or more bores or holes 150 for receiving optical fibers. Three fibers 155, 160, 165 are inserted into the bores 150 of switch 100. As described in more detail below, the fiber 155 is an input fiber for carrying an input light beam and the fibers 160, 165 are output fibers for carrying an output light beam. Switch 100 is used to switch an input light beam carried in the input fiber 155 between the output fibers 160, 165.

Lensing element 110 is positioned in front of the second face 147 of port 105 such that lensing element 110 focuses a light beam into the cores of the output fibers 160, 165 and collimates a light beam from the input fiber 155. Lensing element 110 can be implemented as a graded index ("GRIN") lens.

The birefringent crystal 115 (hereinafter, crystal 115) is positioned in front of lensing element 110. Crystal 115 is constructed from a birefringent material, such as calcite, that divides or separates a light beam into two orthogonal polarized beams or rays: an ordinary ray having a refractive index, $n_o$, and an extraordinary ray having a refractive index $n_e$.

Half-wave plate pair 120 is positioned in front of crystal 115. The optical axes of half-wave plate pair 120 is oriented such that the beams that pass through the pair have the same polarization state.

Faraday rotator 125 and the electromagnet 130 are positioned adjacent to half-wave plate pair 120. Faraday rotator 125 is constructed from a material that causes a rotation of light beams. The amount of rotation of the beams is a function of the thickness of Faraday rotator 125. In general, the thicker the Faraday rotator, the more rotation that will be imparted on the beams. For example, Faraday rotator 125 can have a thickness that causes a 90°, 180°, or 360° rotation. The rotation caused by Faraday rotator 125 can be increased by the application of an electromagnetic field to the light beam as it passes through the rotator. Thus, when the electromagnetic field is removed (e.g., electromagnet 130 is not powered), Faraday rotator 125 rotates the light-beams a first amount to change the polarization. When the electromagnetic filed is applied (e.g., electromagnet 130 is activated or powered), Faraday rotator 125 rotates the light beams by a second amount to change the polarization. Alternatively, the field strength may be changed to effectuate a similar result.

Prism 135 is positioned adjacent to Faraday rotator 125 and receives the light beams from the rotator. Referring also to FIG. 2, the prism 135 can be a polarizing beam splitter that consists of two geometrically identical wedges 175 of a birefringent or doubly-refracting material, such as quartz or calcite, that are cemented together. Wedges 175 have outer faces 180, 181 and inner faces 185, 186. The wedges 175 are cut such that their optical axes are oriented perpendicularly to each other when the inner faces 185, 186 of the wedges 175 are cemented together. Examples of cements that can be used include glycerine and castor oil. However, wedges 175 are not necessarily cemented together in all applications, such as when the power requirements of the switch are excessive. Beams that pass through the prism 135 are refracted based on the angle of the cemented, inner faces 185, 186 of wedges 175 relative to the outer faces 180, 181. The prism may be a Wollaston prism.

The mirror 140 is positioned adjacent to prism 135. The beams that pass through prism 135 are reflected by mirror 140. Mirror 140 is adjusted or positioned relative to prism 135 such that the beams are reflected back into prism 135.

Switch 100 is used to change the switch's output from output fiber 160 to output fiber 165. As described in more detail below, the control of this switching operation is based on applying an electromagnetic field to Faraday rotator 125 so as to change the polarization of the beams.

FIGS. 3 and 4 illustrate the use of switch 100 to route a light beam 200 from input fiber 155 to output fiber 160. In this routing of the light beam, switch 100 is operated without an electromagnetic field (e.g., no power applied to the electromagnet 130). FIG. 3 illustrates the beams and the components and FIG. 4 illustrates the polarization of the beams after passing through each component of switch 100. Initially, light beam 200 passes from fiber 155 to port 105 and then through lensing element 110, which collimates light beam 200. Light beam 200 then passes through crystal 115, which separates the light beam into two orthogonal, polarized beams 205, 210. The polarized beams 205, 210 then pass through half-wave plate pair 120, which causes beams 205, 210 to have the same polarization state. Beams 205, 210 then pass through Faraday rotator 125. The thickness of Faraday rotator 125 is selected such that when no field is present (e.g., electromagnet 130 is not powered) there is a 180° polarization change as the beams pass through Faraday rotator 125. In this manner, the beams have the same polarization. Beams 205, 210 then pass through prism 135, which refracts the beams without changing their polarization. Beams 205, 210 then are reflected by mirror 140 at a first portion of the mirror. The mirror is positioned relative to prism 135 such that beams 205, 210 are reflected back into prism 135. Prism 135 is designed such that beams 205, 210 are refracted within the prism such that they exit the prism in the direction of Faraday rotator 125 at a known position or portion on the outer face 180. In this manner, the beams ultimately can be combined as a single beam and directed into output fiber 160. Beams 205, 210 pass back though half-wave plate pair 120 without a change in polarization state. Beams 205, 210 then pass through crystal 115, which orthogonally polarizes the beams, and lensing element 110, which combines the beams into a single beam 215 that is directed into output fiber 160.

FIGS. 5 and 6 illustrate the use of the switch 100 to route a light beam 200 from input fiber 155 to output fiber 165. In this routing of light beam 200, an electromagnetic field is present (e.g., power is applied to electromagnet 130) to change the rotation of the light beam. FIG. 5 illustrates the beams and the components and FIG. 6 illustrates the polarization of the beams after passing through each component of switch 100. The presence or absence of the electromagnetic field produces different results as beams pass through Faraday rotator 125. With power applied to electromagnet 130, the polarization of light beams 205, 210 is changed in Faraday rotator 125 by 90 degrees relative to the polarization of the light beams within half-wave plate pair 120. This changes the refraction of beams 205, 210 in prism 135 relative to the condition in which there is no power applied to the electromagnet. Because of the change in refraction in prism 135, the light beams are refracted within the prism and exit from the prism at a position on or portion of the outer face 180 that is different from the position on or portion of the outer face when power is not applied to electromagnet 130. As a consequence, beams 205, 210 will reflect off of a different position or portion of mirror 140 relative to the un-powered condition and return on a different path through the components of switch 100. In particular, beams 205, 210 pass through a different path in prism 135, Faraday rotator 125, half-wave plate 120, and crystal 115. This causes the beams 205, 210 to enter the lensing element 110 at a different position and thereby be collimated into output fiber 165 instead of output fiber 160.

A number of embodiments of the invention have been described. Nevertheless, it will be understood that various modifications may be made without departing from the spirit and scope of the invention. For example, the Faraday rotator can have a thickness such that light that passes through the Faraday rotator is rotated by 90° when power is not applied to the electromagnets and, for example, 180° when power is applied to the electromagnets. In this manner, powering the electromagnets causes the polarization of the beams to stay the same. Such an arrangement causes the beams to be switched when power is deactivated. In another arrangement, multiple Faraday rotators can be placed in series. For example, referring to FIG. 7, two rotators can be placed in series in a switch. The first rotator 125*a* has a thickness, $t_1$, and the second rotator 125*b* has a thickness $t_2$. When power is applied to the Faraday rotator 125*a*, and not applied to the Faraday rotator 125*b*, the total rotation is 90°. When power is applied to the Faraday rotator 125*b* but not the Faraday rotator 125*a*, the total rotation is 180° (i.e., the polarization does not change). The Faraday rotators 125, 125*b* also can be arranged such that when both Faraday rotators are powered there is a third rotation and when not powered there is yet another, fourth rotation. In this manner, a fourth fiber can be connected to the holder and the switch operated to switch between three output fibers. The switch also can be operated with an electromagnetic field continuously applied to the Faraday rotator 125. The electromagnetic field can be controllably varied to change the rotation of the light beams based on the amount of the electromagnetic field applied to the Faraday rotator. Accordingly, many modifications may be made by one of ordinary skill in the art without departing from the spirit and scope of the appended claims.

What is claimed is:

1. A magneto-optical switch comprising:
a birefringent crystal configured to receive a light beam;
a half-wave plate pair configured to receive the light beam from the birefringent crystal;
a Faraday rotator configured to receive the light beam from the half-wave plate and further configured to change a polarization state of the light beam by a first amount when an electromagnetic field is applied and by a second amount when the electromagnetic field is removed;
a prism configured to receive the light beam from the Faraday rotator,
a reflective surface configured to receive the light beam from the Faraday rotator, and
a port coupled to a first input optical fiber, a first output optical fiber, and a second output optical fiber, wherein the light beam passes between the first input optical fiber and the first output optical fiber when the electromagnetic field is applied and between the first input optical fiber and the second output optical fiber when the electromagnetic field is removed.

2. A magneto-optical switch comprising:
a birefringent crystal configured to receive a light beam;
a half-wave plate pair configured to receive the light beam from the birefringent crystal;
a Faraday rotator configured to receive the light beam from the half-wave plate and further configured to change a polarization state of the light beam by a first amount when the electromagnetic field is applied and by a second amount when the electromagnetic field is removed;
a prism configured to receive the light beam from the Faraday rotator;
a reflective surface configured to receive the light beam from the Faraday rotator, and
a port coupled to a first input optical fiber, a first output optical fiber, and a second output optical fiber, wherein the light beam passes between the first input optical fiber and the second output optical fiber when the electromagnetic field is applied and between the first input optical fiber and the first output optical fiber when the electromagnetic field is removed.

3. A magneto-optical switch comprising:
a birefringent crystal configured to receive a light beam;
a half-wave plate pair configured to receive the light beam from the birefringent crystal;
a Faraday rotator configured to receive the light beam from the half-wave plate;
a Wollaston prism configured to receive the light beam from the Faraday rotator;
a reflective surface configured to receive the light beam from the Faraday rotator, wherein the Faraday rotator is configured to receive an electromagnetic field to change the polarization of the light beam as it passes through the Faraday rotator, and wherein the reflective surface is positioned adjacent to the Wollaston prism, whereby a light beam passing through the Wollaston prism will be reflected by the reflective surface in a direction of the Wollaston prism.

4. A magneto-optical switch comprising:
a birefringent crystal configured to receive a light beam;
a half-wave plate pair configured to receive the light beam from the birefringent crystal;
a Faraday rotator configured to receive the light beam from the half-wave plate; and
a Wollaston prism configured to receive the light beam from the Faraday rotator; and
a reflective surface,
wherein the reflective surface is positioned adjacent to the Wollaston prism, whereby a light beam passing through the Wollaston prism will be reflected by the reflective surface in a direction of the Wollaston prism.

5. The magneto-optical switch of claim 4, further comprising a port configured to receive optical fibers.

6. The magneto-optical switch of claim 5, further comprising three optical fibers coupled to the port.

7. The magneto-optical switch of claim 5, further comprising a leasing element, wherein the birefringent crystal receives the light beam from the lensing element and the lensing element receives the light beam from the port.

8. The magneto-optical switch of claim 4, wherein the birefringent crystal is configured to separate a received light beam into two polarized beams.

9. The magneto-optical switch of claim 4, wherein the half-wave plate pair is configured to cause the light beams passing through the half-wave plate pair to have a same polarization state.

10. The magneto-optical switch of claim 4, wherein the Faraday rotator is configured to change the polarization state of the light beams by a first amount when a electromagnetic field is applied and by a second amount when the electromagnetic field is removed.

11. The magneto-optical switch of claim 10, wherein the Faraday rotator is configured to rotate the light beams by 90 degrees when the electromagnetic field is applied.

12. The magneto-optical switch of claim 10, further comprising a port coupled to a first input optical fiber, a first output optical fiber, and a second output optical fiber, wherein the light beam passes between the first input optical fiber and the first output optical fiber when the electromagnetic field is applied and between the first input optical fiber and the second output optical fiber when the electromagnetic field is removed.

13. The magneto-optical switch of claim 10, further comprising a port coupled to a first input optical fiber, a first output optical fiber, and a second output optical fiber, wherein the light beam passes between the first input optical fiber and the second output optical fiber when the electromagnetic field is applied and between the first input optical fiber and the first output optical fiber when the electromagnetic field is removed.

14. The magneto-optical switch of claim 4, wherein the reflective surface comprises a mirror.

15. The magneto-optical switch of claim 4, wherein the prism is configured to refract light beams passing therethrough.

16. The magneto-optical switch of claim 4, wherein the switch further comprises an electromagnet configured to apply an electromagnetic field.

* * * * *